United States Patent [19]
Alsheimer et al.

[11] Patent Number: 5,851,117
[45] Date of Patent: Dec. 22, 1998

[54] BUILDING BLOCK TRAINING SYSTEMS AND TRAINING METHODS

[75] Inventors: Keith A. Alsheimer, Groton; Andrianne H. Fitzgerald, Marlborough, both of Mass.

[73] Assignee: The Butcher Company, Marlborough, Mass.

[21] Appl. No.: 839,053

[22] Filed: Apr. 23, 1997

[51] Int. Cl.[6] .................................................. G09B 19/00
[52] U.S. Cl. .......................................... 434/219; 434/430
[58] Field of Search ................................... 434/428, 430, 434/219, 236, 238, 226, 184, 107, 108

[56] References Cited

U.S. PATENT DOCUMENTS

| | | | |
|---|---|---|---|
| 3,688,414 | 9/1972 | Koehlinger et al. | 434/219 |
| 3,968,573 | 7/1976 | Poliniere | 434/430 |
| 4,019,027 | 4/1977 | Kelley | 434/108 |
| 4,776,799 | 10/1988 | Walsh | 434/238 |
| 5,100,621 | 3/1992 | Berke et al. | 434/428 |
| 5,145,377 | 9/1992 | Tarvin et al. | 434/219 |
| 5,254,193 | 10/1993 | Carter et al. | 434/430 |
| 5,372,507 | 12/1994 | Goleh | 434/219 |
| 5,573,404 | 11/1996 | Stawski, II | 434/238 |
| 5,577,915 | 11/1996 | Feldman | 434/238 |

*Primary Examiner*—Paul J. Hirsch
*Attorney, Agent, or Firm*—Robert L. Goldberg; Peter F. Corless

[57] ABSTRACT

A building block training system and method of training of cleaners of facilities to be used on the job which utilizes a plurality of pictorial displays showing a specific set of steps to accomplish a cleaning operation in an efficient safe manner, e.g., dusting or vacuuming of a facility as well as a plurality of pictorial displays as to what must not be missed and must be avoided in performing the cleaning operation.

9 Claims, 9 Drawing Sheets

Perfect Mopping

Fig. 4

Utility Steps

Carpet Spotting

Spray Buffing

TELL about each step

SHOW each step

Do each step

REVIEW 2-3 steps

Fig. 8

BUILDING BLOCK TRAINING SYSTEMS AND TRAINING METHODS

BACKGROUND OF THE INVENTION

The present invention relates to a building block training system and method for use by contractors and others for cleaning facilities such as offices, airports, retail stores, schools, lodging facilities, health care facilities, stadiums and amusement parks.

Classroom training is an extremely difficult training medium for contractors. Their workers (cleaners) are spread out across a wide geographic area, and they typically experience very high turnover. Therefore, contractors need a training system that they can deliver themselves (not have to depend on someone else to come in and give training), and use on-the-job (as opposed to in a classroom) training. The training system of this invention is designed to be both delivered by the contractor supervisor and used on the job. Therefore, when the supervisor needs to train a new (worker) on how to clean a restroom, for example, he simply pulls out his binder with flip charts, goes to the restroom to be cleaned with the cleaner, and does the training. A flip chart vehicle is used in the present building block training system and allows the supervisor to use it in a wide variety of cleaning settings.

The training system herein is of a modular design. Each system is divided (by tabs) into separate sections. For example, the sections for the "Perfect Office" binder include all of the aspects for cleaning a typical office building such as trashing, vacuuming, dusting, cleaning restrooms, sweeping and mopping floors and utility functions like spray buffing floors and removing spots from carpets. Other systems on the market do not break up the job function (cleaning tasks) in this manner. Instead, they break the building into components like the lobby, cafeteria, and offices, and then lump all the cleaning tasks repetitively in each section. There are several advantages to the modular design of the present training system. Most of the modules or "building blocks" allow the trainee to focus on mastering one skill at a time. Adults learn more by hands-on experience and by repetition. The training system herein allows the trainee to do one skill repetitively until they are ready to move on to the next skill. By contrast, the prior training systems lump all the skills required to clean a particular area of the building, together so there is no opportunity to focus on one particular skill.

Many contractors gain significant labor efficiencies by creating "specialists" within their workforce. For example, in a ten story office building, instead of ten people each doing all the cleaning tasks by themselves on each of the ten floors, "specialists" would clean specific parts of all ten floors. With one person doing the dusting, one person cleaning restrooms, and one person doing the vacuuming instead of ten people doing all these things, there are significant savings in equipment and labor. You only need one vacuum instead of ten, and you don't have all the wasted time going back and forth to the janitors' closet to get different supplies and equipment. The modular nature of the Building Block system allows the contractor to train workers based on their specific job function (restroom cleaning, dusting, vacuuming, etc.).

Another benefit to the present invention is that re-training of existing workers is much easier to do. For example, if a contractor receives complaints about an area not getting properly cleaned, he or she can use the training tool to re-train on only the key areas the worker has been missing.

Every area of a building has several key items that if not correctly cleaned will result in the most customer complaints. For example, in a restroom, not refilling supplies (paper towels and toilet paper), or in an office, emptying the trash cans and then not putting the empty cans back where they belong. Each of the cleaning modules preferably has fifteen to twenty individual cleaning steps involved overall, but there is communicated the three to five steps that are the most critical. In the present system, these critical steps are communicated to workers and their importance emphasized by using the term "deadly sins", as well as illustrations depicting customer reactions to these problems. The "deadly sins" focus the worker on things that are most important.

The contract cleaning industry generally relies upon a low wage, unskilled labor pool. Therefore, many language and literacy issues abound. It is therefore important to provide a training tool that does not depend upon language alone to communicate the message. The present system relies upon illustrations to communicate the key learning points.

For other training systems, reference may be made to the following patents: U.S. Pat. Nos. 5,145,377; 5,312,257; 5,018,976; 5,100,621; 5,000,446; 1,597,457; 1,656,030;4,693,480; 1,793,251; 3,750,309; 4,462,597; 2,883,765; 4,643,680; 4,846,691; 4,472,146; 4,533,328; 4,419,081; 4,270,284; 4,345,902; 4,231,168; 3,482,333; 3,389,480; 683,267; 3,823,492; 1,342,520; and 1,244,000.

SUMMARY OF THE INVENTION

This invention relates to on the job training systems for use by a trainer as well as a method of teaching cleaning personnel on the job to perform certain tasks associated with cleaning building facilities. As used herein, the term cleaning includes maintenance such as replenishing of paper and other products as well as cleaning operations, e.g. dusting, vacuuming, and etc. The training system comprises illustrations of specific cleaning operations as well as an indication of the cleaning product to be used in each operation. The cleaning products are preferably identified by numbers or letters or both so that words will not have to be used to identify the cleaning products (e.g. detergent). Each building block also contains what are termed the deadly sins in pictorial form as to what each customer (facility user, owner) will not tolerate with regard to the detail necessary to present the cleaned premises in the best light. The system also includes reinforcement cards for carrying by each worker during the cleaning of the premises reiterating that which has been taught to the worker by the trainer.

As used herein, cleaning products may include products such as deodorizers, floor finish, cleaners, strippers and etc. The training system includes a plurality of building blocks, each block related to each group of tasks associated with certain types of cleaning functions e.g., dusting, vacuuming and etc.

The training system used herein preferably employs the trainer telling the trainee cleaner about each step as the training material is shown illustrating the step, then the trainer performs the physical step while the worker watches, then the worker does the same physical step performed by the trainer, while the trainer coaches, e.g. applying the cleaning solution, and then the worker reviews each step with the trainer while showing the trainer the illustrations in the training materials.

In this way, there can easily be provided to a worker the information necessary to guide the worker as to what to do and what not to do when performing the task throughout the facility, no matter what part of the facility is being cleaned.

DESCRIPTION OF THE PREFERRED EMBODIMENT

Figure 1:
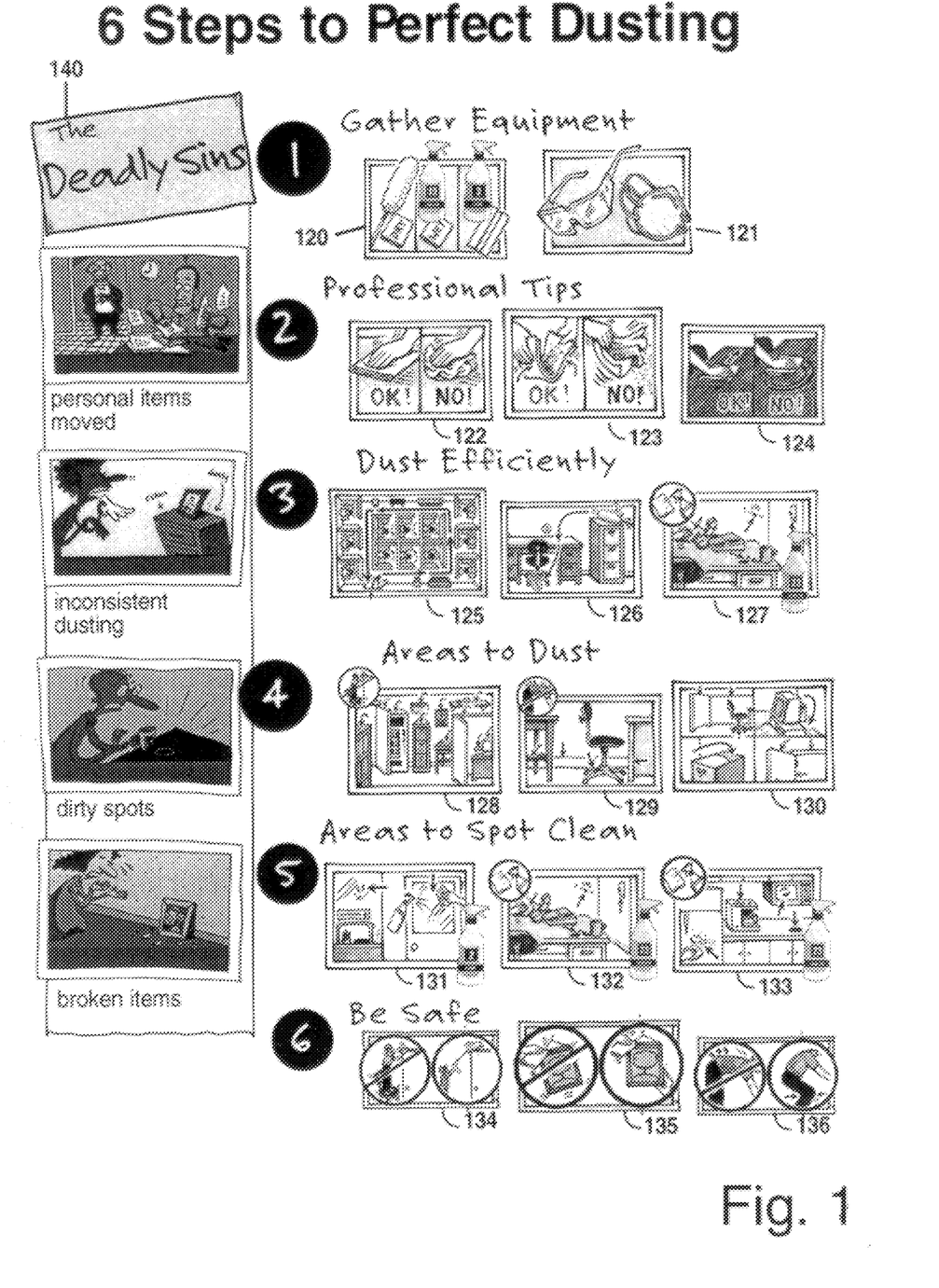
FIG. 1 is a diagrammatic view of a page of the flip chart illustrating the information imparted to the worker by the trainer for the dusting building block of this invention.
Figure 2:
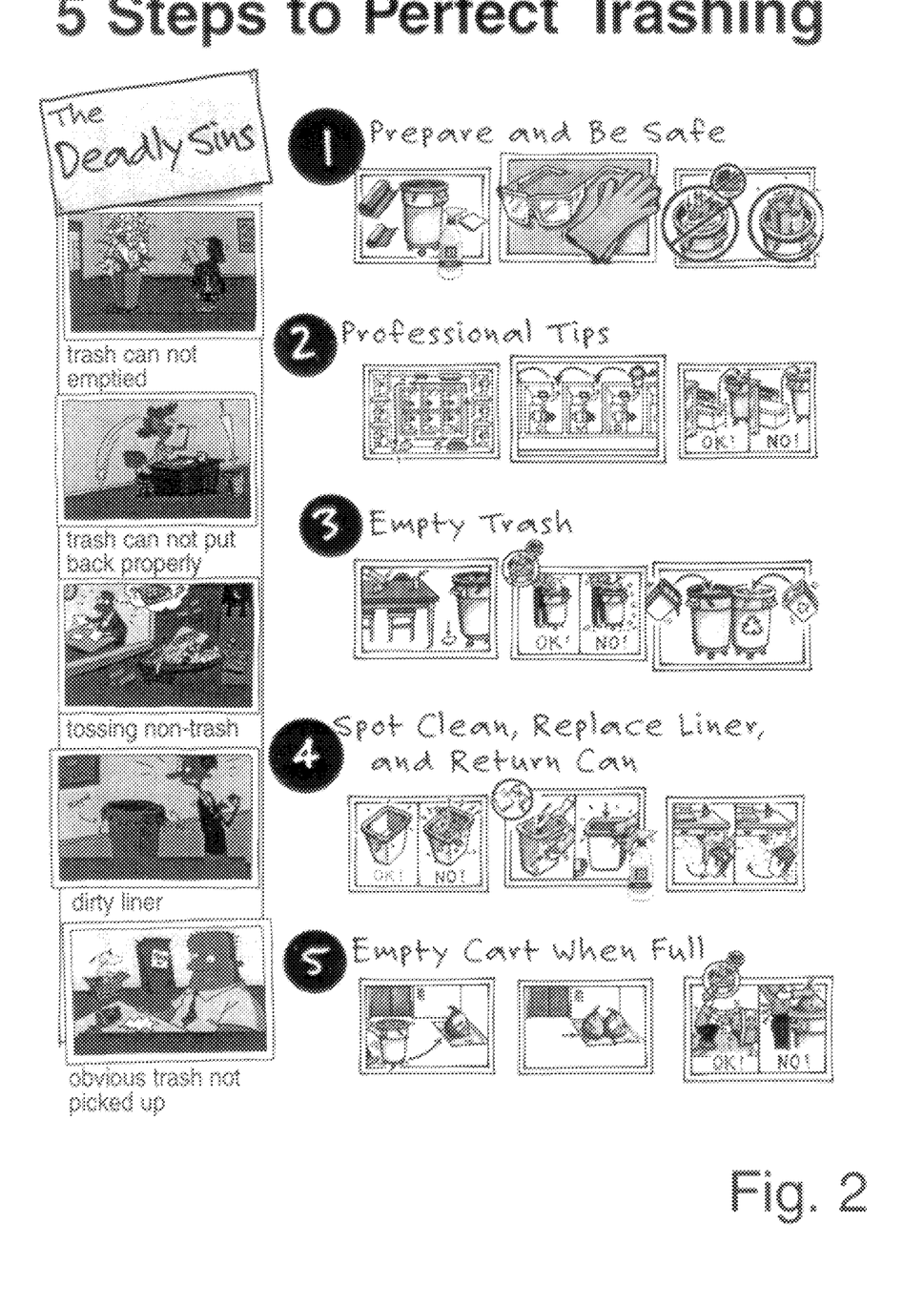
FIG. 2 is a diagrammatic view of a page of the flip chart illustrating the information imparted to the worker by the trainer for the trashing building block of the invention.
Figure 3:
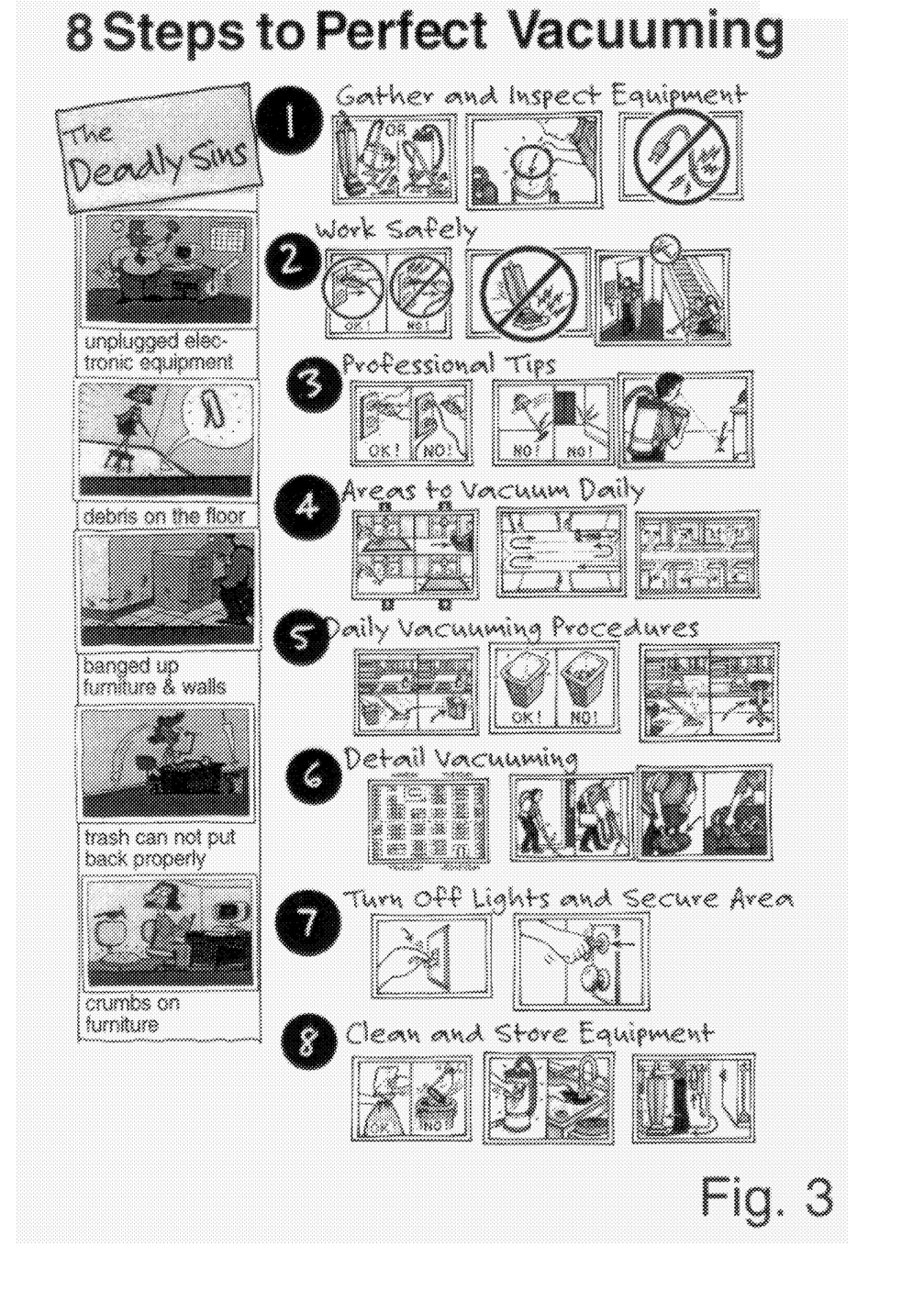
FIG. 3 is a diagrammatic view of a page of the flip chart illustrating the information imparted to the cleaner by the worker for the vacuuming building block of this invention.
Figure 4:
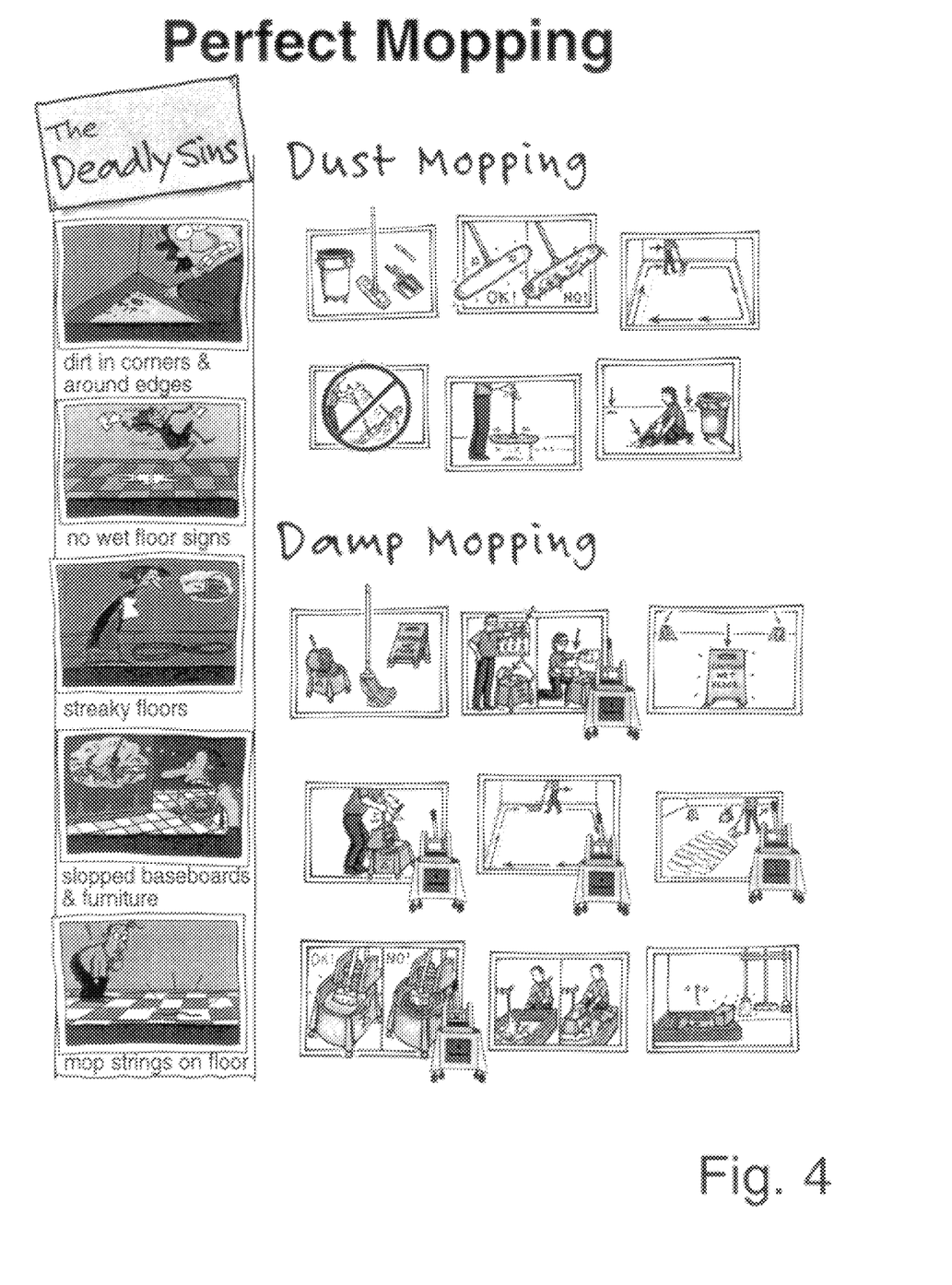
FIG. 4 is a diagrammatic view of a page of the flip chart illustrating the information imparted to the worker by the trainer for the mopping building block of this invention.
Figure 5:
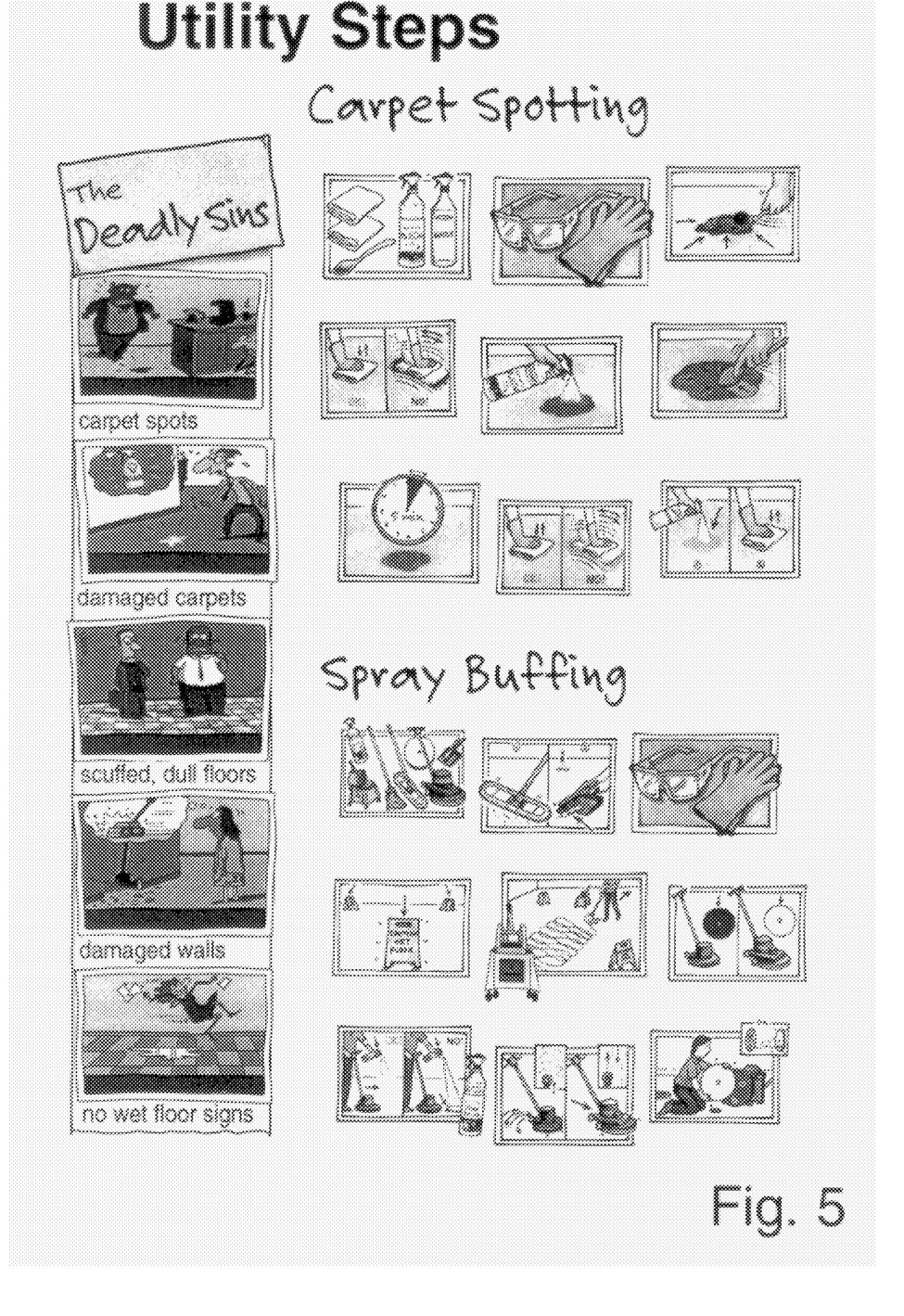
FIG. 5 is a diagrammatic view of a page of the flip chart illustrating the information imparted to the worker by the trainer for the utility building block of this invention.
Figure 6:
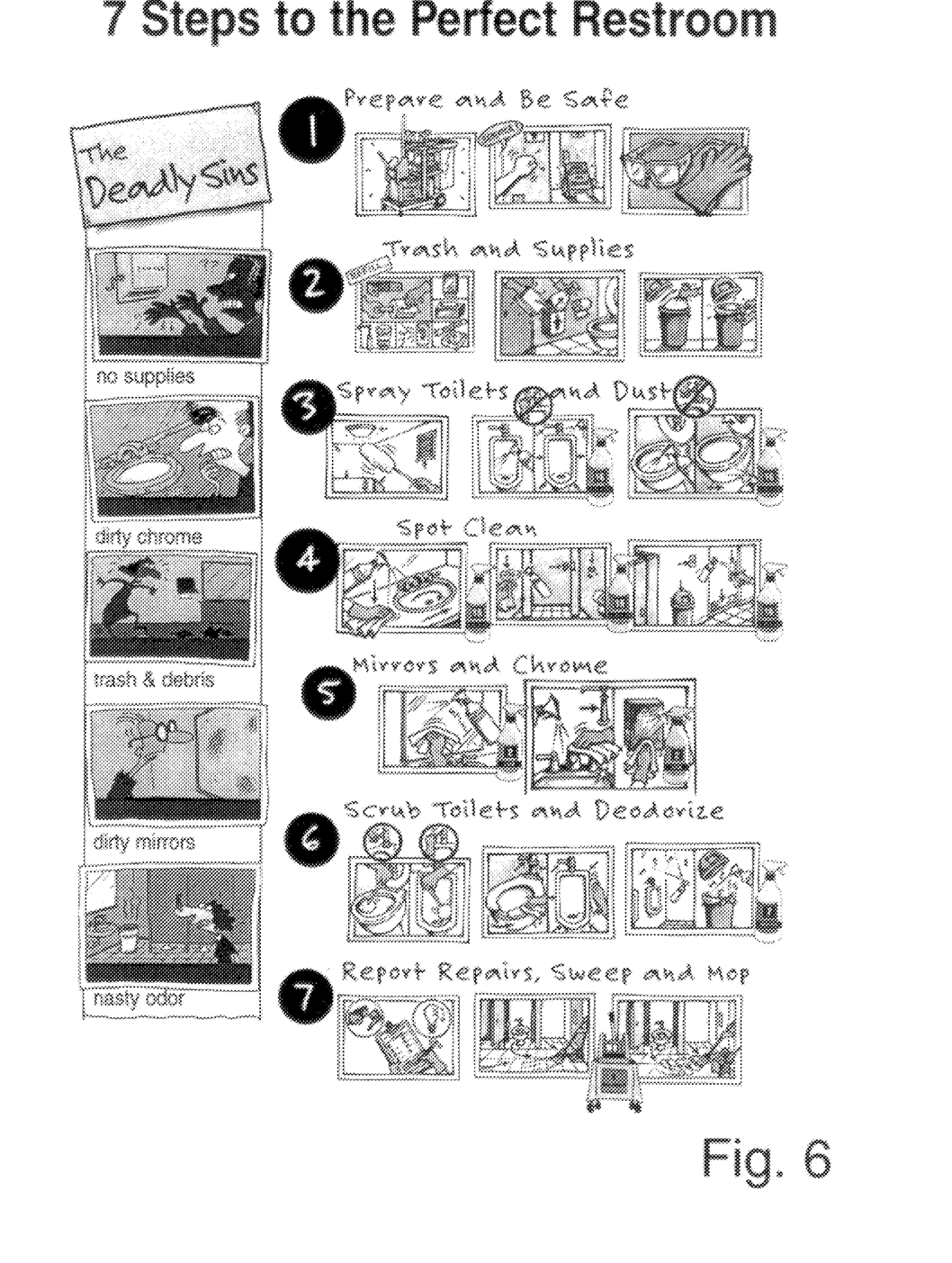
FIG. 6 is a diagrammatic view of a page of the flip chart illustrating the information imparted to the worker by the trainer for the restroom building block of this invention.

Referring now to FIGS. 1 to 6, the training system of this invention includes in a binder a plurality of visual training presentations, e.g. flip charts, for teaching cleaners how to perform certain overall functions e.g. dusting, to maintain a facility such as an office building. FIG. 1 illustrates a flip chart page presentation of steps to be used in dusting (which term includes spot cleaning) as well as the cleaning products (identified by numeric and/or alpha indicia) to be used in each operation, the safety and cleaning equipment to be used by the worker and the do's and dont's associated with each step as well as the deadly sins (those things which will not be tolerated by the facility property users).

With particular reference to FIG. 1, the training system used by a trainer is illustrated by a sequence of steps as follows: (1) Gather Equipment, (2) Professional Tips, (3) Dust Efficiently, (4) Areas to Dust, (5) Areas to Spot Clean, and (6) Be Safe, which will now be described.

As may be seen in the preferred sequence of steps, Step (1) entitled "Gather Equipment", is illustrated by box 120 which pictorially shows the equipment to be gathered e.g., brushes, wipers, clothes etc., for performing dusting as well as the cleaning supplies using identifying numbers or letters or both and box 121 illustrates safety equipment e.g., safety glasses and masks to be used to safely protect oneself in performing the functions. Boxes 122 to 124 are provided to show suggested professional tips (Step 2) as to the use of at least some of the equipment when performing the cleaning operation.

Thereafter, boxes 125 to 127 containing illustrations are provided as to how one cleans efficiently (Step 3), and boxes 128 to 130 pictorially illustrates the areas to be cleaned (dusted) (Step 4) and the associated cleaning product numbered product e.g. 2 and 23 to be used (e.g. product numbered 2 to be applied to glass and product identified by number 23 to be applied to a cloth and used in wiping the front of a refrigerator as in box 133). There is also provided boxes 131 to 133 showing the areas to be spot cleaned (Step 5) and boxes illustrating safety precautions to be used are shown at 134 to 136 (Step 6).

As an additional step, in training workers to dust, there is pictorially provided what are termed in box 140, the Deadly Sins, i.e., those steps or missed steps which the worker has to pay particular attention to performing the cleaning (in this case the dusting) operation.

Thus, the flip chart of FIG. 1, provides the trainer with the opportunity to step by step show the person being trained what is needed to do the task, how to efficiently do the task, the areas of the facility (e.g. building) and contents thereof to be cleaned as well as the safe way of doing things and what to avoid (the deadly sins) in doing these functions.

Figure 7A:
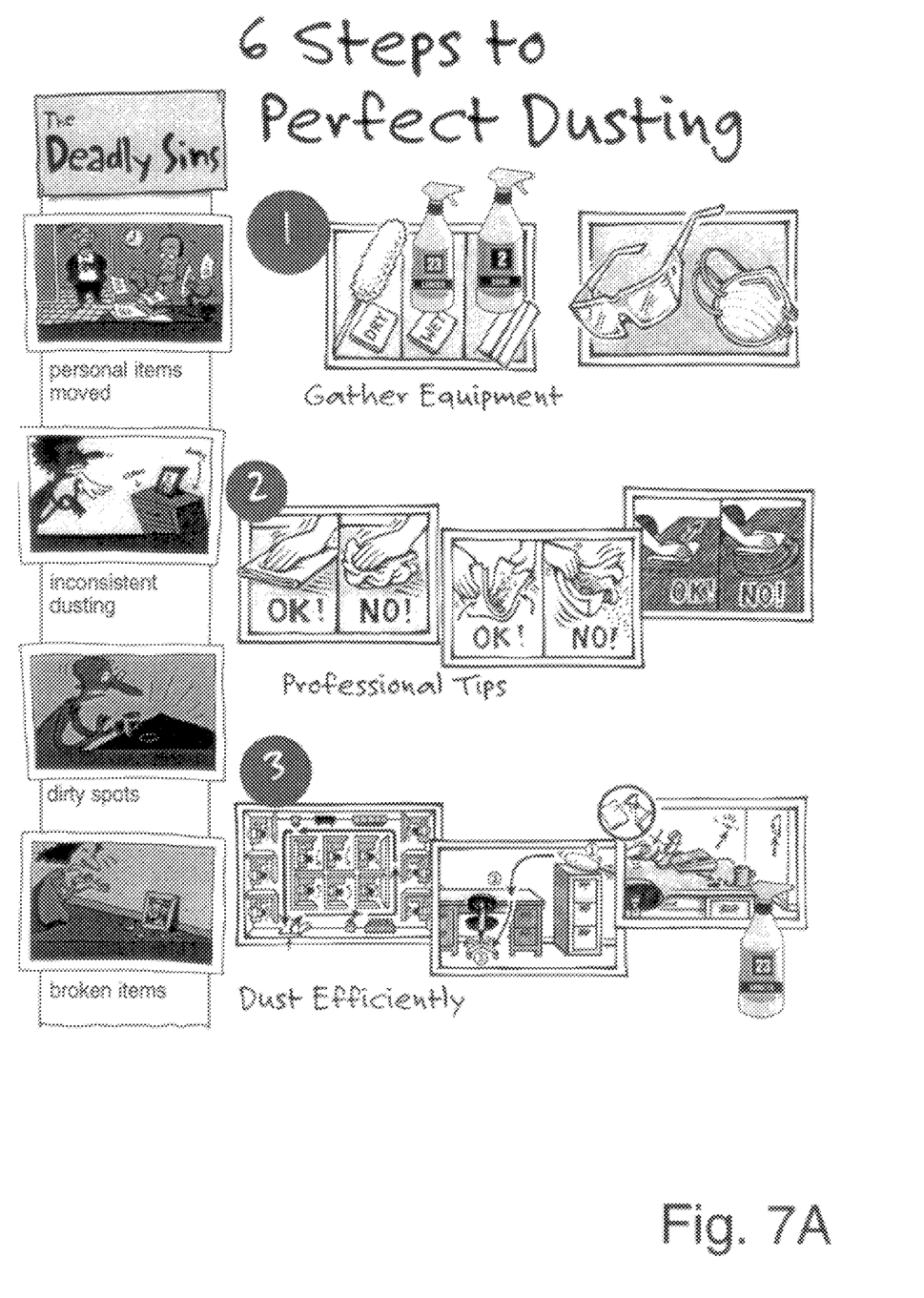
FIGS. 7A and 7B is a diagrammatic view of the front and back respectively of a card provided to the worker for the dusting building block for reference after the initial training or re-training.
Figure 7B:
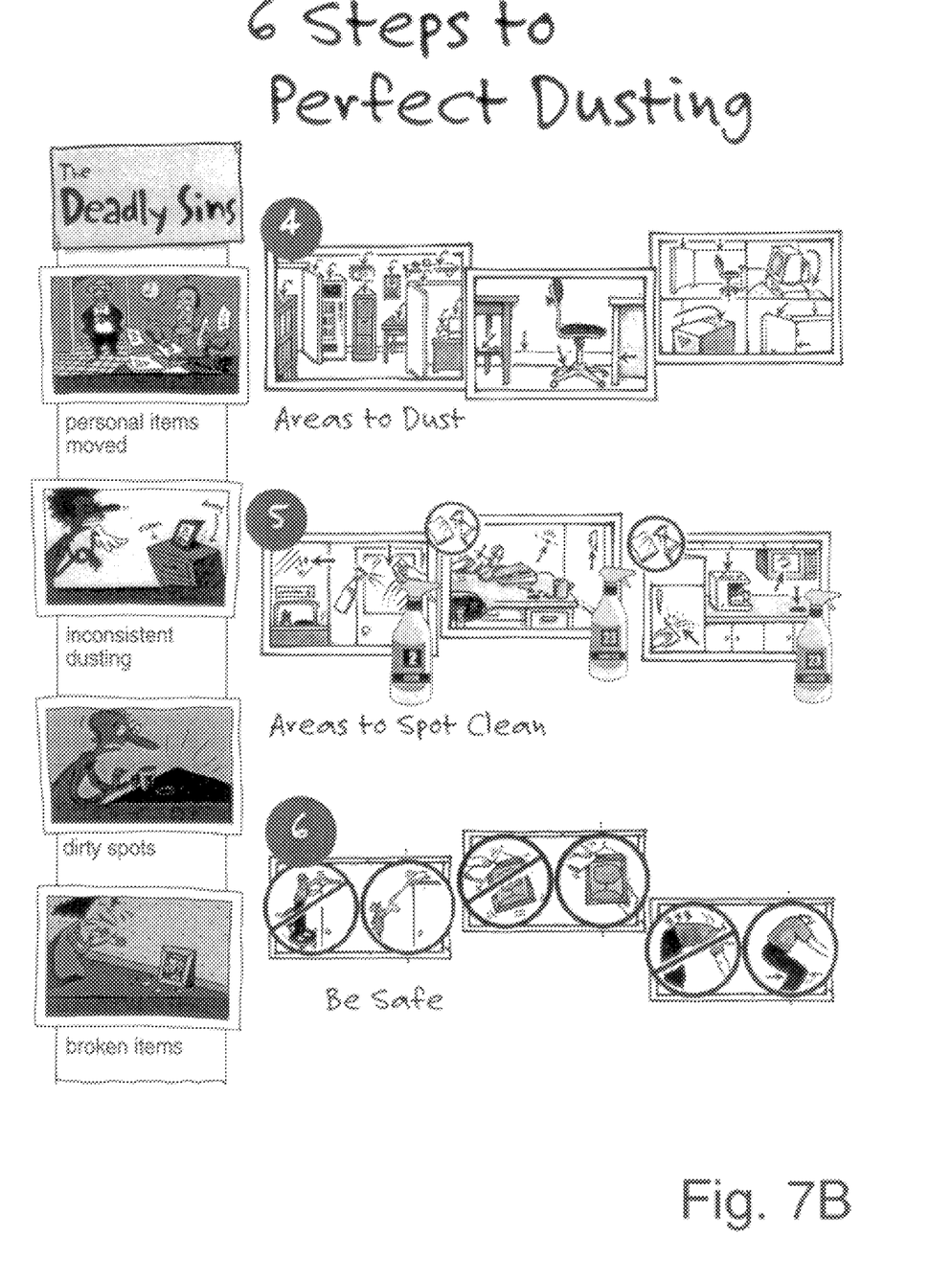

By this presentation, training those having language difficulties as well as those who are mentally challenged or less educated can be done in a cost efficient way. As an additional aid for the worker after training has taken place, reference cards, e.g. as shown in FIG. 7(A) and 7(B) are provided to the worker which have the information which has already been provided by the trainer.

In addition, the trainer should also perform the steps illustrated in FIG. 1 rather than only describing the applications to the cleaner being educated.

Reference should now be had to FIGS. 2 to 6 which show us the same type of information to be used as in FIG. 1, but associated with different maintenance operations e.g. vacuuming, restrooms, trashing, mopping and utility functions such as carpet spotting and spray buffing to effectively clean the facility.

Figure 8:
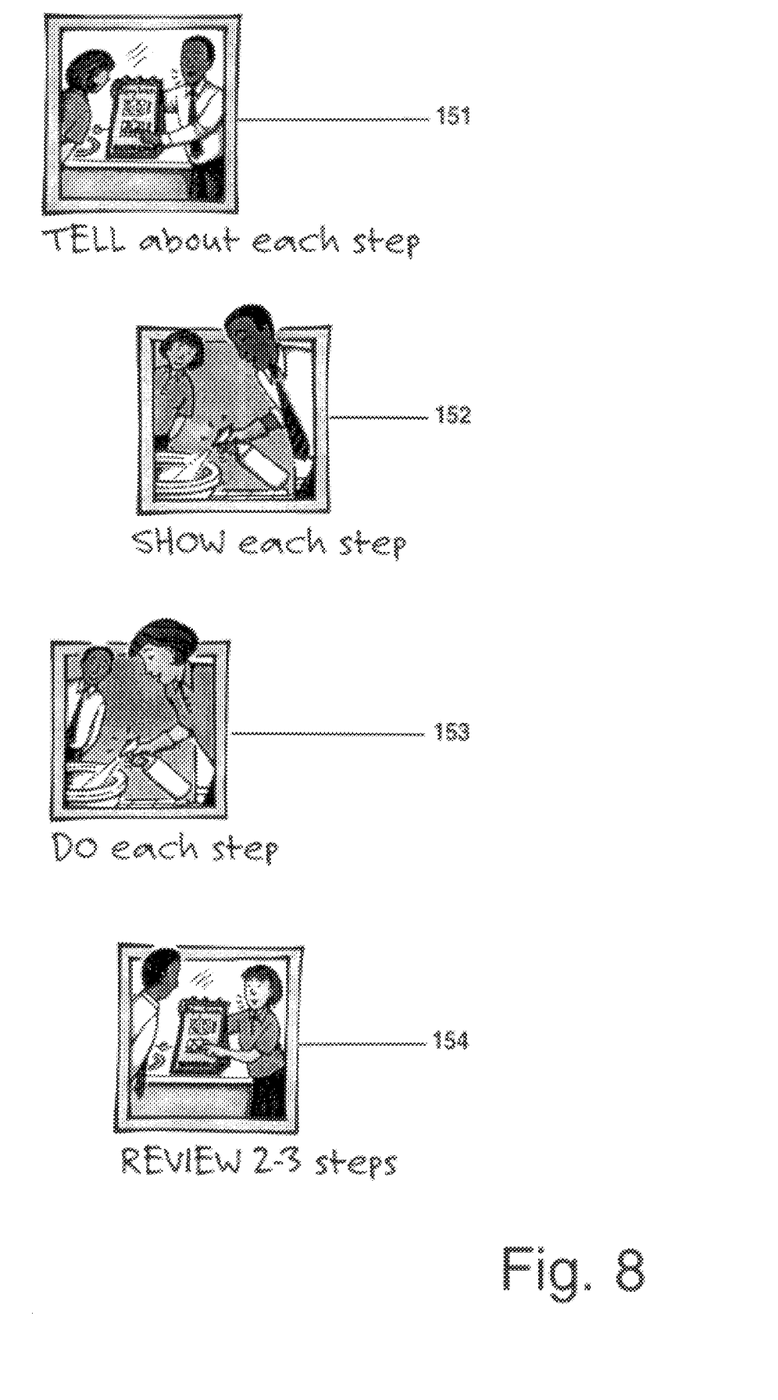
FIG. 8 illustrates the preferred method used by the trainer in teaching the cleaner trainee.

Reference should now be made to FIG. 8, the sequence of boxes 151, 152, 153 and 154 illustrates the preferred method of using the training tool of this invention. In block 151, the trainer (person with tie) first tells about each step to the student (worker) (person with short sleeve shirt) using the flip chart portion illustrating the operations to be performed. In block 152, the trainer then shows the worker how to physically perform the step (e.g. spraying a toilet bowl with a cleaning solution). In block 153, the worker physically repeats the step the trainer just did while the trainer coaches, and in block 154, the worker now reviews the steps by showing and describing to the trainer the steps in the flip chart that the worker just learned.

Thus, this invention provides training systems and methods particularly suited for use in high employment turnover situations and particular in situations where persons being trained have difficulty with the language of the community or where the individuals being trained have less education or are education or mentally disadvantaged. Because of the steps employed and in the manner in which the steps are preferably taught, reinforcement of the training experience is achieved. While a specific embodiment has been shown and described, it will be understood by those skilled in the art that changes and modifications may be made thereto without departing from the teachings of the invention herein.

What is claimed is:

1. A method of a trainer teaching a cleaner, the method comprising:

(a) providing a training system for use in on the job training of worker whose job functions include the cleaning of a facility, the training system comprising a plurality of sections, each training system section containing instructions for cleaning a typical facility, each training system section limited in instructions to a specific physical job function to be performed in the facility, and each training system section containing illustrations of what is to be done and illustrations of what is not to be skipped and what is to be avoided in performing the cleaning job functions;

(b) in the facility, the trainer showing the cleaner a document of a section of the training system, the document pictorially indicating what the cleaner is to do in each step of a specific job function;

(c) the trainer telling the cleaner about each step pictorially depicted in the document;

(d) the trainer showing the cleaner how to perform each step pictorially depicted in the document; and (e) the trainer having the cleaner perform the step in the presence of the trainer while the trainer coaches and the trainer having the cleaner tell the trainer about the step while referring to the document.

2. The method of claim 1 wherein the training system includes words in association with the pictorial depiction illustrating what job is to be done.

3. The method of claim 1 wherein the training system includes alpha or numeric identified articles which either contain cleaning, floor maintenance or deodorizing products are positioned adjacent to at least some of the jobs depicted pictorially that are to be done by the worker for informing the worker as to what cleaning or deodorizing product is to be used.

4. The method of claim 1 wherein the training system comprises instructions for all aspects of cleaning an office building.

5. The method of claim 1 wherein the facility is an office building.

6. The method of claim 1 wherein the facility is a retail store.

7. The method of claim 1 wherein the facility is a stadium or an amusement park.

8. The method of claim 1 wherein the facility is a school.

9. The method of claim 1 wherein the facility is a lodging facility.

* * * * *